United States Patent
Kain et al.

(10) Patent No.: US 8,728,328 B2
(45) Date of Patent: May 20, 2014

(54) METHODS FOR REMOVING SUSPENDED SOLIDS FROM A GASIFICATION PROCESS STREAM

(75) Inventors: James Scott Kain, Houston, TX (US); Priyadharshini Swaminathan, Houston, TX (US); Dinh-Cuong Vuong, Houston, TX (US)

(73) Assignee: General Electric Company, Schenectady, NY (US)

( * ) Notice: Subject to any disclaimer, the term of this patent is extended or adjusted under 35 U.S.C. 154(b) by 1467 days.

(21) Appl. No.: 11/877,239

(22) Filed: Oct. 23, 2007

(65) Prior Publication Data

US 2009/0101598 A1    Apr. 23, 2009

(51) Int. Cl.
| | |
|---|---|
| *B01D 37/02* | (2006.01) |
| *B01D 29/62* | (2006.01) |
| *B01D 33/44* | (2006.01) |
| *C02F 1/52* | (2006.01) |
| *C02F 101/00* | (2006.01) |
| *B01D 17/04* | (2006.01) |
| *C02F 9/00* | (2006.01) |
| *C02F 1/00* | (2006.01) |
| *C02F 11/12* | (2006.01) |
| *C01B 3/52* | (2006.01) |
| *C02F 103/18* | (2006.01) |
| *F25J 1/00* | (2006.01) |

(52) U.S. Cl.
CPC .............. *B01D 37/02* (2013.01); *B01D 17/047* (2013.01); *C02F 9/00* (2013.01); *C02F 1/001* (2013.01); *C02F 11/12* (2013.01); *C02F 2001/007* (2013.01); *C02F 2103/18* (2013.01); *C02F 2303/16* (2013.01); *C02F 1/52* (2013.01); *C01B 3/52* (2013.01); *F25J 1/0072* (2013.01)

USPC .......... 210/777; 210/768; 210/771; 210/791; 210/806; 210/803; 210/208; 210/209; 210/295; 210/260; 210/506

(58) Field of Classification Search
None
See application file for complete search history.

(56) References Cited

U.S. PATENT DOCUMENTS 2,455,130 A * 11/1948 Lomax et al. ................. 210/778
3,589,516 A    6/1971 Camirand et al.
(Continued)

FOREIGN PATENT DOCUMENTS

| AU | 5904994 | * | 9/1994 |
|---|---|---|---|
| DE | 4309825 A1 | | 9/1994 |

(Continued)

OTHER PUBLICATIONS

International Search Report, PCT/US2008/073578, dated Apr. 3, 2009, pp. 5.

*Primary Examiner* — Krishnan S Menon
(74) *Attorney, Agent, or Firm* — Armstrong Teasdale LLP

(57) ABSTRACT

A method of removing suspended solids from a gasification process water stream includes, in an exemplary embodiment, providing a gasification process water stream containing process derived suspended solids, settling at least a portion of the suspended solids from the process water stream in a settling apparatus, providing a filter apparatus having a plurality of filter elements, and removing a portion of the settled solids from the settling apparatus. The method also includes precoating the filter elements with the settled solids removed from the settling apparatus, directing a portion of the process water stream from the settling apparatus to the filter apparatus, and filtering the portion of the process water stream directed from the settling apparatus through the precoated filter elements to remove suspended solids particles to form a filtrate.

15 Claims, 4 Drawing Sheets

(56) References Cited

U.S. PATENT DOCUMENTS

| | | |
|---|---|---|
| 3,928,532 A | 12/1975 | Squires |
| 4,028,219 A | 6/1977 | Baldwin et al. |
| 4,046,690 A | 9/1977 | Rodgers et al. |
| 4,168,234 A | 9/1979 | Hutto, Jr. |
| 4,301,015 A | 11/1981 | Parsons et al. |
| 4,507,208 A * | 3/1985 | Simon et al. .......... 210/721 |
| 4,632,766 A | 12/1986 | Firnhaber et al. |
| 5,167,820 A | 12/1992 | Clough et al. |
| 5,182,165 A | 1/1993 | Clough et al. |
| 5,266,204 A | 11/1993 | Clough et al. |
| 5,269,935 A | 12/1993 | Clough et al. |
| 5,474,585 A | 12/1995 | Geibel et al. |
| 6,503,401 B1 | 1/2003 | Willis |
| 6,514,418 B1 | 2/2003 | Bartscherer et al. |
| 2007/0172408 A1 | 7/2007 | Takagi |

FOREIGN PATENT DOCUMENTS

| | | |
|---|---|---|
| EP | 0184137 A1 | 6/1986 |
| EP | 0219612 A2 | 4/1987 |
| EP | 0648828 A2 | 4/1995 |
| EP | 0686598 A2 | 12/1995 |
| FR | 2187678 * | 1/1974 |

* cited by examiner

METHODS FOR REMOVING SUSPENDED SOLIDS FROM A GASIFICATION PROCESS STREAM

BACKGROUND OF THE INVENTION

This invention relates generally to filtering a process water stream, and more particularly to filtering a gasification process water stream.

At least some known combined cycle power systems used for power generation include a gasification system that is integrated with at least one power-producing turbine system. For example, known gasifiers convert a mixture of fuel, air or oxygen, steam, and/or limestone into an output of partially combusted gas, sometimes referred to as "syngas." Hot combustion gases are supplied to the combustor of a gas turbine engine, which powers a generator that supplies electrical power to a power grid. Exhaust from at least some known gas turbine engines is supplied to a heat recovery steam generator that generates steam for driving a steam turbine. Power generated by the steam turbine also drives an electrical generator that provides additional electrical power to the power grid.

The products of combustion and syngas generated in combustion zone of the gasifier, including gaseous byproducts, slag, soot, char, unreacted carbon, ash, refractory compounds, and inert process materials, are collected in process water at the bottom of the gasifier. The process water containing the suspended process solids is referred to as black water. For process efficiency, it is desirable to separate the suspended solids from the black water so that the process water can be recycled or used in other processes. Typically, settling and filtering methods are used to remove the suspended solids from the black water with known filtering methods utilizing a precoat material. These methods convert black water to a process water containing less solids, which is referred to as grey water. A portion of this grey water is purged (blown down) to prevent the buildup of dissolved contaminants and fouling or erosive solids in the gasification process. The grey water blow-down needs to be treated for remove the contaminants prior to reuse or disposal to the environment, One of the disposal processes of grey water is deep well injection (DWI). Prior to injection, the grey water is treated to meet required characteristics that prevent harmful effects in the deep well. For example, in one known gasification project, the required characteristics of the grey water for DWI includes less than about 2 mg/L of total suspended solids, less than about 2 microns for the solids particle size, and a pH of about 4 to about 5. A known filtering method is used to remove the suspended solids from the grey water. The known filtering method utilizes a precoat material of diatomaceous earth, aluminum silicates, cellulose, perlite, activated carbon, wood flour, and/or other known commercial blend precoat/body-feed products. The use of these known precoat materials adds cost to the gasification process, and some of the known precoat materials, for example diatomaceous earth, have limited availability.

BRIEF DESCRIPTION OF THE INVENTION

In one aspect, a method of removing suspended solids from a gasification process water stream is provided. The method includes providing a gasification process stream containing process derived suspended solids, settling at least a portion of the suspended solids from the process water stream in a settling apparatus, providing a filter apparatus having a plurality of filter elements, and removing a portion of the settled solids from the settling apparatus. The method also includes precoating the filter elements with the settled solids removed from the settling apparatus, directing a portion of the process stream from the settling apparatus to the filter apparatus, and filtering the portion of the process stream directed from the settling apparatus through the precoated filter elements to remove suspended solids particles to form a filtrate.

In another aspect, a method of removing suspended solids from process water of a fossil or hydrocarbon fuel gasification process is provided. The method includes providing fossil or hydrocarbon fuel gasification process water containing process derived suspended solids, settling at least a portion of the suspended solids from the gasification process water to produce gasification grey water, precoating filter elements of a filter apparatus with a portion of the settled solids, directing a portion of the gasification grey water to the filtering apparatus, and filtering the portion of the grey water through the precoated filter elements to remove fine suspended particles to form a filtrate containing less than about 2 milligrams per liter of suspended solids.

In another aspect, a system for removing suspended solids from process water of a fossil or hydrocarbon fuel gasification process is provided. The system includes a black water settling apparatus in flow communication with a fossil or hydrocarbon fuel gasification process and configured to receive the gasification process black water and produce settled solids and grey water from the black water, and a filter assembly that includes a plurality of filter elements. Each filter element is precoated with a portion of the settled solids obtained from the black water settling apparatus. The filter assembly is in flow communication with the black water settling apparatus.

DETAILED DESCRIPTION OF THE INVENTION

A method and system for removing suspended solids from a gasification process water stream (black water) is described below in detail. The method includes settling the larger solids particles from the black water and utilizing a portion of the collected solids as a precoat for filter elements in a filtering apparatus to remove the smaller particles from the decanted process water (grey water). The described method provides for recovering and reusing solids produced or used during gasification, promoting water reuse or recycling for gasification, and permitting deep well injection of residual salt containing waste streams that are difficult and expensive to treat.

Figure 1:
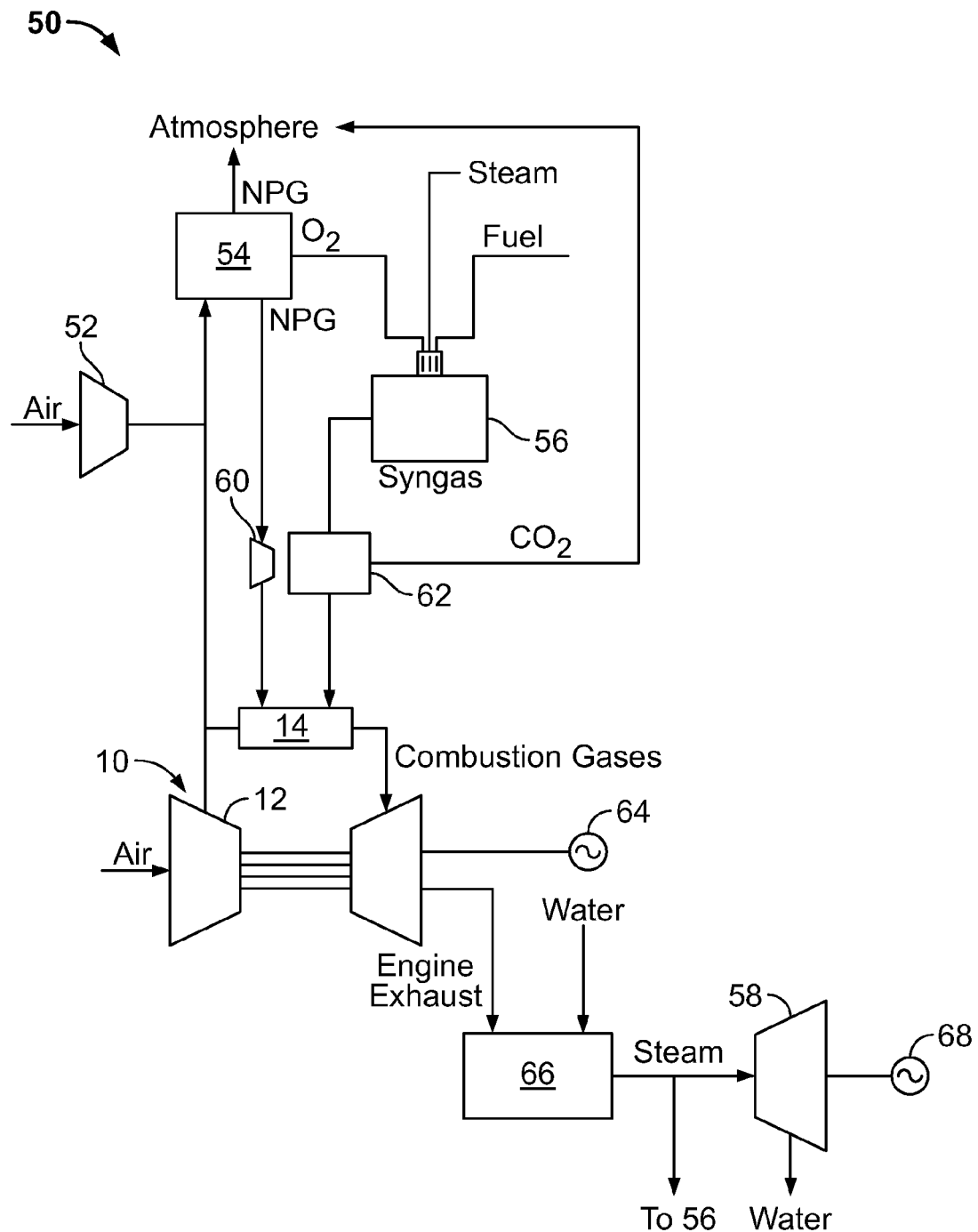
FIG. 1 is a schematic diagram of an exemplary integrated gasification combined-cycle (IGCC) power generation system.

Referring to the drawings, FIG. 1 is a schematic diagram of an exemplary integrated gasification combined-cycle (IGCC) power generation system 50. IGCC system 50 generally includes a main air compressor 52, an air separation unit 54 coupled in flow communication to compressor 52, a gasifier 56 coupled in flow communication to air separation unit 54, a gas turbine engine 10, coupled in flow communication to gasifier 56, and a steam turbine 58. In operation, compressor 52 compresses ambient air. The compressed air is channeled to air separation unit 54. In some embodiments, in addition or alternative to compressor 52, compressed air from gas turbine engine compressor 12 is supplied to air separation unit 54. Air separation unit 54 uses the compressed air to generate oxygen for use by gasifier 56. More specifically, air separation unit 54 separates the compressed air into separate flows of oxygen and a gas by-product, sometimes referred to as a "process gas." The process gas generated by air separation unit 54 includes nitrogen and will be referred to herein as "nitrogen process gas." The nitrogen process gas may also include other gases such as, but not limited to, oxygen and/or argon. For example, in some embodiments, the nitrogen process gas includes between about 95% and about 100% nitrogen. The oxygen flow is channeled to gasifier 56 for use in generating partially combusted gases, referred to herein as "syngas" for use by gas turbine engine 10 as fuel, as described below in more detail. In some known IGCC systems 50, at least some of the nitrogen process gas flow, a by-product of air separation unit 54, is vented to the atmosphere. Moreover, in some known IGCC systems 50, some of the nitrogen process gas flow is injected into a combustion zone (not shown) within gas turbine engine combustor 14 to facilitate controlling emissions of engine 10, and more specifically to facilitate reducing the combustion temperature and reducing nitrous oxide emissions from engine 10. IGCC system 50 may include a compressor 60 for compressing the nitrogen process gas flow before being injected into the combustion zone.

Gasifier 56 converts a mixture of fuel, the oxygen supplied by air separation unit 54, steam, and/or limestone into an output of syngas for use by gas turbine engine 10 as fuel. Although gasifier 56 may use any fuel, in some known IGCC systems 50, gasifier 56 uses coal, petroleum coke, residual oil, oil emulsions, tar sands, and/or other similar fuels. In some known IGCC systems 50, the syngas generated by gasifier 56 includes carbon dioxide. The syngas generated by gasifier 56 may be cleaned in a clean-up device 62 before being channeled to gas turbine engine combustor 14 for combustion thereof. Carbon dioxide may be separated from the syngas during clean-up and, in some known IGCC systems 50, vented to the atmosphere. The power output from gas turbine engine 10 drives a generator 64 that supplies electrical power to a power grid (not shown). Exhaust gas from gas turbine engine 10 is supplied to a heat recovery steam generator 66 that generates steam for driving steam turbine 58. Power generated by steam turbine 58 drives an electrical generator 68 that provides electrical power to the power grid. In some known IGCC systems 50, steam from heat recovery steam generator 66 is supplied to gasifier 56 for generating the syngas.

Figure 2:
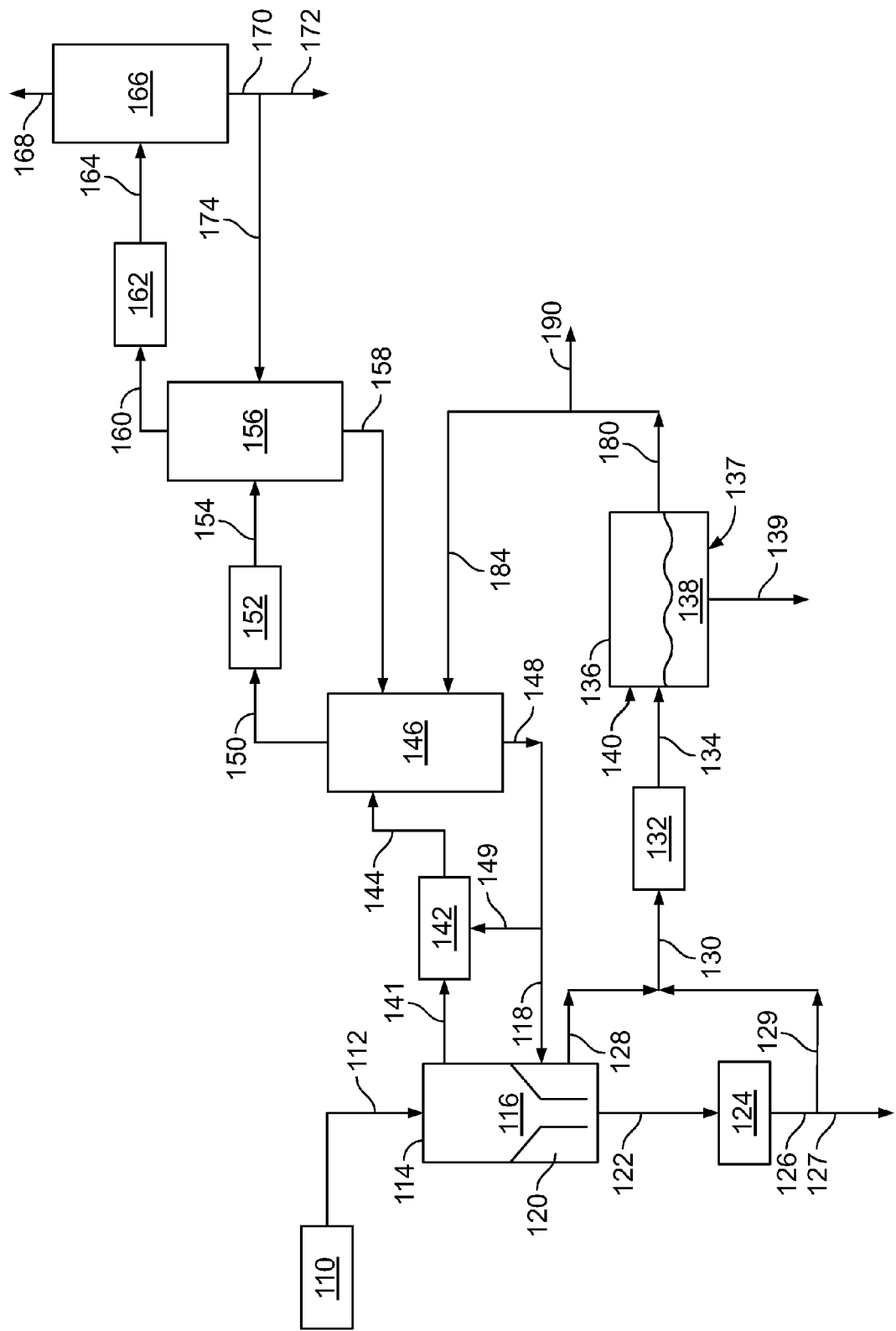
FIG. 2 is a schematic view of an exemplary embodiment of an advanced solids removal gasifier that can be used with the system shown in FIG. 1.

FIG. 2 is a schematic view of an exemplary embodiment of a gasifier system 100 that may be used with system 50 (shown in FIG. 1). In the exemplary embodiment, coal and water are mixed together to form a slurry in tank 110 which is fed to a reaction zone 114 of a high-temperature gasifier 116 through line 112 to which an oxidizing agent such as oxygen is added. Partial oxidation of the coal occurs in a reaction zone 114 to form a raw syngas and a slag by-product which passes to a quench chamber 120 at the lower end of gasifier 116. The hot syngas and molten slag are contacted with a quench water stream 118, and are cooled and separated. The slag is transported in quench water or black water and is conveyed through a line 122 to lockhopper 124 which removes the slag with some black water from the system through a line 126. The slag exits in a line 127 for use as a building material or landfill. Black water stream 128 from quench chamber 120 and black water stream 129 which is separated from line 126 are combined in line 130 and fed to a vacuum flash drum 132.

The black water is cooled in flash drum 132 and exits through a line 134 to a solids settling apparatus 136 where a portion of the solids suspended in the black water are separated from the black water and removed from the system in line 139. Settling apparatus 136 creates a stagnant condition for the black water which causes a portion of the solids suspended in the black water to settle to a bottom area 137 of settling apparatus 136. Settled solids 138 are removed from settling apparatus 136 through a solids outlet drain pipe 139. The suspended solids in the black water have a wide particle size distribution. Settling apparatus 136 removes the larger particle solids from the black water. The water containing the remaining smaller particle solids is referred to herein as grey water which is located in an upper area 140 of settling apparatus 136.

Syngas exits quench chamber 120 through a line 141 to a venturi scrubber 142 and then through line 144 to a carbon scrubber 146 where fine ash and soot are removed from the syngas and exit in a water stream through a line 148. Line 148 divides into line 149 which enters the venturi scrubber 142 to serve as the aqueous scrubbing medium, and into line 118. The water flowing through line 118 serves as quench water introduced to quench chamber 120.

Particulate-free syngas with entrained water exits the top of carbon scrubber 146 through line 150 to condenser 152, where some water is condensed, and then passes through line 154 to a water knockout tank 156 which separates the water from the syngas. An underflow water stream 158 exits tank 156 and enters the top of carbon scrubber 146. A syngas stream 160 exits the top of water knockout tank 156, and enters condenser 162 which condenses ammonia and the balance of the water, which exits through line 164 to syngas separator 166 and exits system 100 as a clean syngas stream 168. A water stream 170 exits syngas separator 166, and is separated into blowdown stream 172 and stream 174, which is recycled to water knockout tank 156.

If the nitrogen to chlorine ratio is too low to neutralize all the chloride content, ammonia can be added to the water at venturi scrubber 42 and/or carbon scrubber 146. The criteria for making this ratio determination is the pH of the water in the scrubbers. In one embodiment, the pH is maintained at least about 6 or above, and another embodiment from about 6 to about 9. This assures ammonium chloride recovery. Another indication that additional ammonia is needed is the absence of ammonia in underflow stream 158 from water knockout tank 156 and/or stream 170 exiting syngas separator 166.

A grey water stream 180 exits solids settler 136 and is separated into a grey water stream 184 which enters the bottom of carbon scrubber 146 and is supplied with additional make-up water, if needed. Grey water stream 180 is also separated into a blowdown grey water stream 190 containing ammonium chloride and suspended solids, which exits system 100 for further treatment to remove soluble salts and suspended solids.

Figure 3:
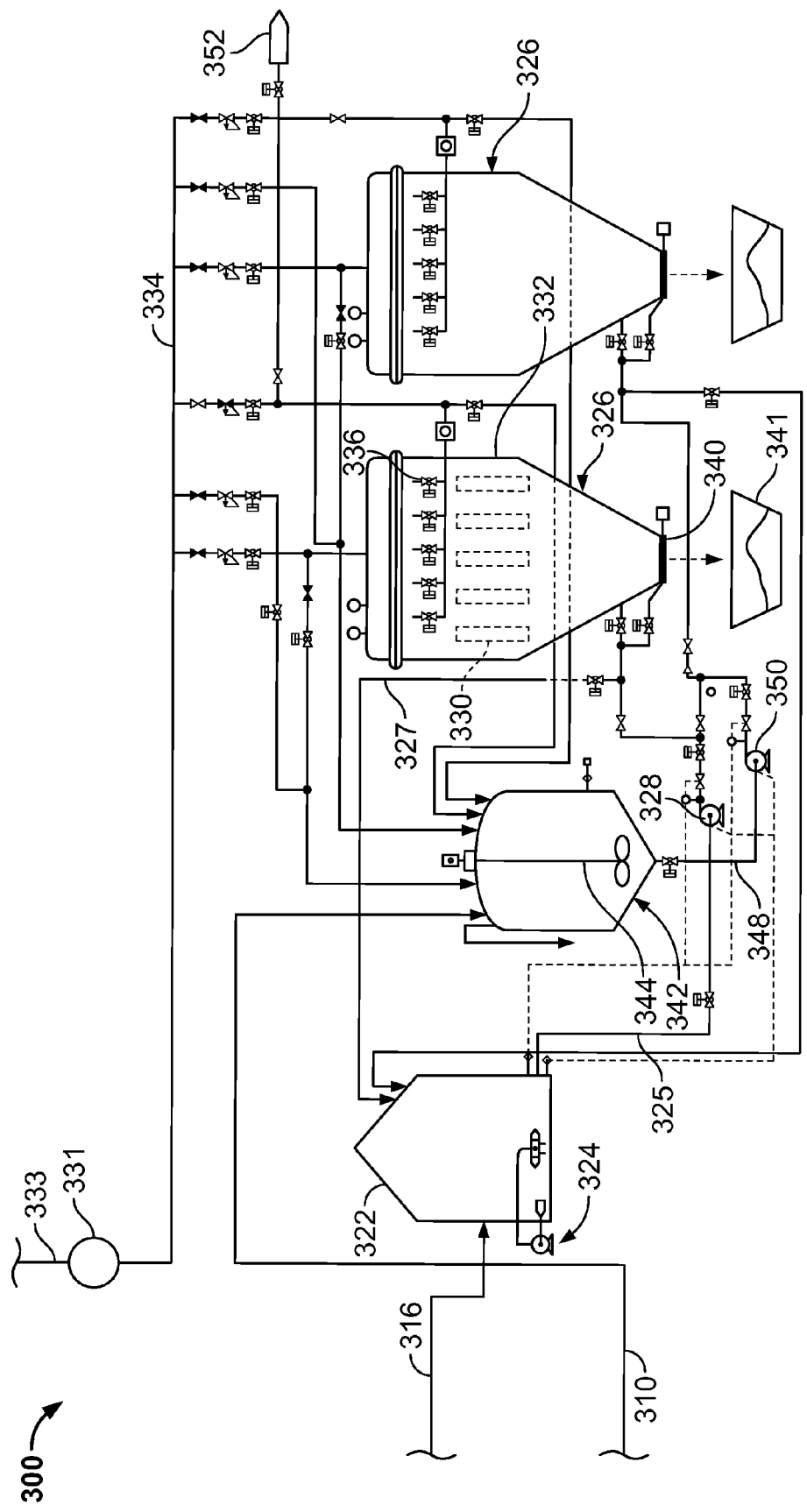
FIG. 3 is a schematic diagram of an exemplary embodiment of a filter system for removing suspended solids from the process water of the gasifier shown in FIG. 2.

FIG. 3 is a schematic diagram of an exemplary embodiment of a filter system 300 for removing suspended solids from the process water of gasifier 116. Referring FIGS. 2 and 3, grey water stream 190 flows to filter system 300 through a grey water pipe 316 which is connected to a grey water storage/feed tank 322. In the exemplary embodiment, a jet mixing system 324 is located in storage/feed tank 322 to keep the solids suspended. In other embodiments, other types of mixers are used, for example, pump mixers and mechanical mixers. In another embodiment, storage/feed tank 322 does not include a mixer. Grey water 190 is pumped into at least one filter apparatus 326 through a grey water feed pipe 325 extending between storage/feed tank 322 and each filter apparatus 326. Having one or more filter apparatus 326 permits the use of a batch treatment, a semi-continuous treatment, or a continuous treatment utilizing two or more filter apparatus 326 with one filter apparatus 326 in a precoated stand-by mode. Grey water feed pipe 325 includes a pump 328 for pumping grey water 190 through feed pipe 325.

Filter apparatus 326 include a plurality of filter elements 330 mounted inside a filter housing 332. A pulse air line 334 is connected to a plurality of nozzles 336 positioned inside filter housing 332. Compressed air and/or inert gas, for example nitrogen, is used to pulse clean filter elements 330 and remove any built up filter cake 338 (shown in FIG. 4). In the exemplary embodiment, a portion of the excess high-pressure nitrogen formed in air separation unit 54 (shown in FIG. 1) is directed to a nitrogen receiver 331 through line 333. The nitrogen is let down to a lower pressure and directed through line 334 to be used in pulsing cleaning filter elements 330 and to dry filter cake 338. The filter cake 338 falls to the bottom of filter housing 332 and is removed through an outlet 340. In the exemplary embodiment, filter apparatus 326 is a candle filter apparatus, and in other embodiments filter apparatus is a tube filter apparatus, a leaf filter apparatus, a disk filter apparatus, and the like. In the exemplary embodiment, after the filtration cycle is complete, nitrogen is blown into filter apparatus and the slurry heel surrounding the candle filter elements is pushed and displaced downward to the lowest part of filter apparatus 326. The heel slurry is then evacuated to feed tank 322 through pipe 327. After heel draining, nitrogen continues to pass through filter cake 338 until captive moisture is reduced and the cake is dry. The nitrogen is then vented for disposal. Outlet 340 is opened and the dried filter cake 338 is discharged from filter apparatus 326 into a receptacle 341 for disposal.

Figure 4:
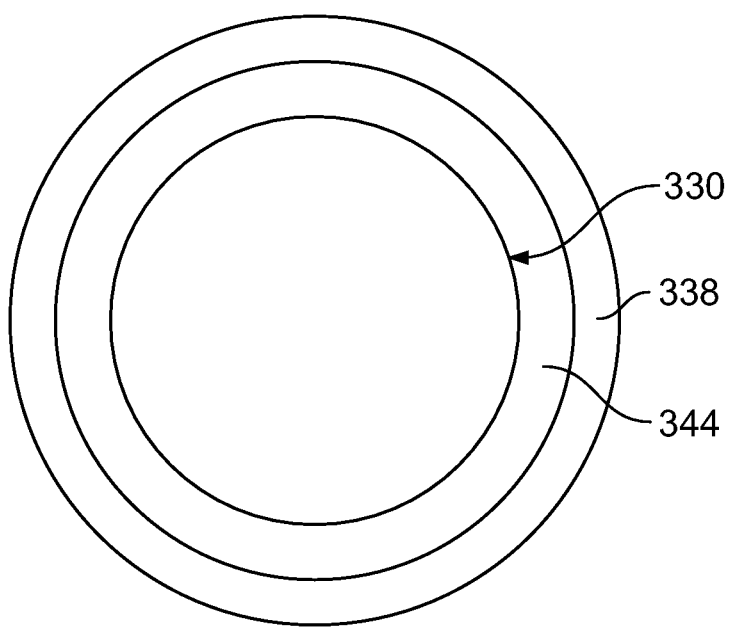
FIG. 4 is a cross-sectional schematic illustration of a filter element shown in FIG. 3.

Solids outlet drain pipe 310 extending from outlet pipe 130 of settling apparatus 136 is connected to a filter precoat tank 342 that contains a mixer 344. Referring also to FIG. 4, a portion of the black water settled solids 138 is used to form a precoat layer 346 on filter elements 330. The reused settled solids 138 replaces expensive commercial precoat materials, for example diatomaceous earth, aluminum silicates, cellulose, perlite, activated carbon, wood flour, and other known commercial blend precoat/bodyfeed products. A precoat pipe 348 connects filter precoat tank 342 with filter apparatus 326. Precoat pipe 348 includes a pump 350 for pumping settled solids 138 through pipe 348 to filter apparatus 326.

In another embodiment, settled solids 138 are used as a body feed material. The settled solids 138 are metered into the grey water feed from storage tank 322 before the grey water enters filter apparatus 326. The body feed acts as additional filter media where suspended particles in the grey water intermingle with the body feed particles which facilitates maintaining the permeability of filter cake 338 as the thickness of filter cake 338 increases. By maintaining permeability of filter cake 338, the length of the filter cycle is extended.

In operation, black water is pumped from vacuum flash drum 132 to settling apparatus 136 where the larger solids particles are settled out of the black water. A portion of settled solids 138 is pumped from settling apparatus 136 to filter precoat tank 342. Settled solids 138 are then pumped to filter apparatus 326 to precoat filter elements 330. Grey water 190 is pumped from settling apparatus 136 to storage/feed tank 322. Grey water 190 is then pumped to filter apparatus 326 to filter out the smaller solids particles from grey water 190. The resultant water filtrate 352 can then be directly discharged, recycled to other plant water process as a source of make-up water, deep well injection, or for sale to a third party for reuse. Water filtrate 352 contains less than about 2 milligrams per liter of suspended solids with the suspended solids having a particle size of about 2 microns or less.

The above detailed description illustrates the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to an exemplary embodiment, namely, systems and methods of filtering gasification process water (black/grey water). However, it is contemplated that this disclosure has general application to filtering systems in industrial and commercial applications.

While the invention has been described in terms of various specific embodiments, those skilled in the art will recognize that the invention can be practiced with modification within the spirit and scope of the claims.

What is claimed is:

1. A method of removing suspended solids from a gasification process water stream, said method comprising:
   providing a gasification process water stream containing process derived suspended solids from partial oxidation of solid feedstock, the suspended solids include larger particle size suspended solids and smaller particle size suspended solids;
   settling, in a settling apparatus, the gasification process water stream such that at least a portion of the larger particle size suspended solids are separated from the process water stream;
   providing a filter apparatus having a plurality of filter elements;
   removing the settled solids from the settling apparatus to a precoat tank;
   precoating the filter elements with at least a portion of the settled solids from the precoat tank;
   directing a portion of the gasification process water stream discharged from the settling apparatus to a feed tank;
   agitating the feed tank such that the smaller particle size suspended solids in the portion of the process water stream remain suspended;
   directing the portion of the process water stream from the feed tank to the filter apparatus after precoating the filter elements with at least a portion of the settled solids from the precoat tank;
   filtering the portion of the process water stream directed from the feed tank through the precoated filter elements to remove the smaller particle size suspended solids to form a filtrate and to form a filter cake on the filter elements;
   directing a portion of nitrogen produced by an air separation unit to a nitrogen receiver upstream from the filter apparatus; and
   directing a portion of the nitrogen stored in the nitrogen receiver to the filter apparatus to dry the filter cake.

2. A method in accordance with claim 1 wherein filtering the portion of the process stream directed from the feed tank comprises filtering the portion of the process stream directed from the settling apparatus through the precoated filter elements to remove suspended solids particles to form a filtrate containing less than about 2milligrams per liter of suspended solids with the filtrate suspended solids having a particle size of about 2 microns or less.

3. A method in accordance with claim 1 further comprising collecting the fine solids particles deposited on the precoated filter elements.

4. A method in accordance with claim 3 further comprising recycling the collected fine solids as fuel.

5. A method in accordance with claim 1 wherein said method comprises a batch treatment, a continuous treatment, or a semi-continuous treatment.

6. A method in accordance with claim 1 wherein the suspended solids comprise at least one of slag, soot, char, unreacted carbon, ash, refractory compounds, and inert process materials.

7. A method in accordance with claim 1 wherein the filter apparatus comprises at least one of candle filters, tube filters, leaf filters, and disk filters.

8. A method in accordance with claim 1 further comprising adding a body feed material into the process water stream before the process water enters the filter apparatus, the body feed material comprising settled solids removed from the settling apparatus.

9. A method of removing suspended solids from process water of a fossil or hydrocarbon fuel gasification process, said method comprising:
- providing fossil or hydrocarbon fuel gasification process water containing process derived suspended solids from partial oxidation of solid feedstock;
- settling at least a portion of the suspended solids from the gasification process water to produce gasification grey water;
- precoating filter elements of a filter apparatus with a portion of the settled solids;
- directing a portion of the gasification grey water to a feed tank;
- agitating the feed tank such that suspended solids in the gasification grey water remain suspended;
- directing a portion of the gasification grey water from the feed tank to the filtering apparatus after precoating filter elements of the filter apparatus with a portion of the settled solids;
- filtering the portion of the grey water through the precoated filter elements to remove fine suspended particles to form a filtrate containing less than about 2 milligrams per liter of suspended solids and to form a filter cake on the filter elements;
- directing a portion of nitrogen produced by an air separation unit to a nitrogen receiver upstream from the filter apparatus; and
- directing a portion of the nitrogen stored in the nitrogen receiver to the filter apparatus to dry the filter cake.

10. A method in accordance with claim 9 wherein filtering the portion of the grey water through the precoated filter elements comprises filtering the portion of the grey water through the precoated filter elements to remove suspended particles to form a filtrate containing less than about 2 milligrams per liter of suspended solids, with the filtrate suspended solids having a particle size of about 2 microns or less.

11. A method in accordance with claim 9 further comprising collecting the fine solids particles deposited on the precoated filter elements.

12. A method in accordance with claim 11 further comprising recycling the collected fine solids as fuel.

13. A method in accordance with claim 9 wherein said method comprises a batch treatment, a continuous treatment, or a semi-continuous treatment.

14. A method in accordance with claim 9 wherein the suspended solids comprise at least one of slag, soot, char, unreacted carbon, ash, refractory compounds, and inert process materials.

15. A method in accordance with claim 9 further comprising adding a body feed material to the grey water prior to directing the grey water to the filter apparatus, the body feed material comprising settled solids removed from the settling apparatus.

* * * * *